April 19, 1932.                W. G. MAYER                1,854,710
VEHICLE BODY AND BUMPER
Original Filed Jan. 14, 1927
Fig. 1.
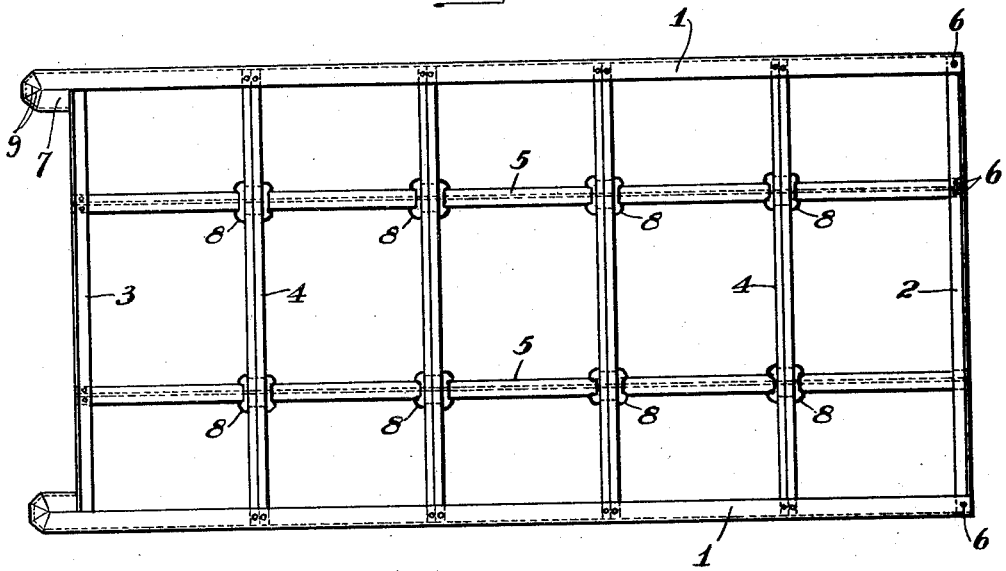
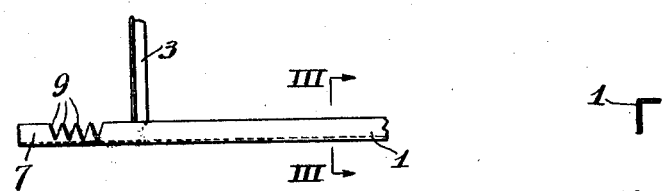
Fig. 2.
Fig. 3.
WITNESSES
William G. Mayer
INVENTOR
by Brown & Critchlow
his Attorneys Patented Apr. 19, 1932

1,854,710

UNITED STATES PATENT OFFICE

WILLIAM G. MAYER, OF PITTSBURGH, PENNSYLVANIA

VEHICLE BODY AND BUMPER

Original application filed January 14, 1927, Serial No. 161,172. Divided and this application filed July 13, 1928. Serial No. 292,471.

This invention relates to vehicle body structures, and particularly to truck body frames built from structural sections. It is an object of the invention to provide such structures with a rear bumper formed from and integral with the structural members, which shall be strong, durable, readily formed, and efficient both as a side and rear end bumper.

Trucks and similar vehicles have not usually been provided with rear bumpers, largely because of the difficulty and cost of equipping them with rear bumpers which were strong, durable and effective for their intended purpose. Such vehicles, because of their weight and size, are difficult to control accurately. They require frequent backing into loading or unloading positions and for these and other reasons they are subject to severe shocks, with the result that the unprotected ends and tail gates are frequently damaged. This with possible injury to the load, entails in the aggregate considerable loss. Such bumpers as have been provided have not been entirely successful, because they comprise separate members connected to the body, and owing to the difficulty of making them strong enough and bracing them properly, they soon become damaged and ineffective.

In accordance with the present invention the side members of a vehicle frame constructed from standard structural shapes or sections are extended beyond the end member at the rear end, and these projecting portions are folded back upon themselves, thus providing a rearwardly projecting integral bumper which effectively overcomes many of the prior difficulties and disadvantages.

The accompanying drawings represent an embodiment of the invention, in which Fig. 1 is a plan view of a body constructed in accordance with the invention; Fig. 2 a fragmentary plan view of one side member before forming the bumper; and Fig. 3 a cross section of a side member taken on line III—III, Fig. 2.

The invention is applicable to vehicle body frames comprising structural section side members, and although it may be practised in a variety of ways, it is preferred to use the construction disclosed and claimed in my copending application, Serial No. 161,172, filed January 14, 1927. In that construction a frame is built up from structural section side and end members, and similar longitudinal and cross brace members are secured to the frame members, and also to one another by a standardized clamp intended for use with standard structural sections. This permits ready and simple assembly, disassembly, reconstruction, and the like, together with other advantages.

The illustrative embodiment shown in the accompanying drawings represents the application of the present invention to a subframe constructed in accordance with the hereinbefore mentioned copending application. The frame comprises side frame members 1, end frame members 2, 3, cross brace members 4, and longitudinal brace members 5, all of which are formed from structural sections, such as angles or the like. The end and side members may be secured to one another in any suitable manner, as by bolts 6, and in the assembly end member 3 is spaced inwardly from the ends of members 1 to leave portions 7, Fig. 2, of considerable length projecting therebeyond. Cross brace members 4 and longitudinal brace members 5 are secured at their ends to the appropriate frame members, and at their points of intersection they are connected by clamps 8, of the type disclosed in my copending application. The frame thus formed is strong, as light as is consistent with the requisite strength, quickly assembled, and may be reconstructed easily.

In order to form the bumper, the projecting ends 7 of side frame members 1 are folded back upon themselves, preferably inwardly of the frame, and in the preferred construction, the ends of the folded portions abut against rear cross member 3, as shown in Fig. 1. Where structural sections are used, the flanges would buckle upon folding. This is prevented by cutting V-shaped notches 9 in the flange portion of ends 7, so that when the ends are folded the flanged portions will form a substantially continuous, flat surface. If desired, the seams formed by the notched sides after folding may be filled in and united by autogenous welding.

The bumper thus provided according to the invention has a relatively broad, rounded end. It is as strong as the body frame itself and cannot be torn off or dislodged. It is also fully effective to prevent damage to the tail gate, or to the load carried, and it is effective both against side shock and rear shock, and being abutted against the rear end frame it is reinforced. The bumper is very inexpensive, since it requires only the added length of structural section, forms a part of the frame itself and eliminates many disadvantages of attached bumpers. Since the side members 1 are rigidly connected to the cross members 2, 3, 4, shocks on the members are distributed through the whole frame, thus preventing undue strain on any one place or part.

According to the provisions of the patent statutes, I have explained the principle and mode of operation of my invention, and have illustrated and described what I now consider to represent its best embodiment. However, I desire to have it understood that, within the scope of the appended claims the invention may be practiced otherwise than as specifically illustrated and described.

I claim:

1. A vehicle body sub-frame construction comprising structural section transverse end members, structural section longitudinal side frame members connected to said end members and projecting therebeyond at the rear end, structural section longitudinal brace members extending between and connected to said end members, and structural section cross brace members extending between said side members and connected thereto and to said longitudinal brace members at points of intersection, the projecting ends of said side members being folded back upon themselves to abut the adjacent end member to provide bumpers, whereby to provide a rigid, substantially unitary sub-frame having an integrally formed bumper and in which bumper shock is relieved through all of its members.

2. A vehicle body sub-frame construction comprising structural section transverse end members, structural section longitudinal side frame members connected to said end members and projecting therebeyond at the rear end, structural section longitudinal brace members extending between and connected to said end members, structural section cross brace members extending between said side members and connected thereto, and clamps connecting said brace members at points of intersection, the projecting ends of said side members being notched and folded inwardly to abut the adjacent end member to provide bumpers, whereby to provide a rigid, substantially unitary sub-frame having an integrally formed bumper and in which bumper shock is relieved through all of its members.

In testimony whereof, I sign my name.

WILLIAM G. MAYER.